United States Patent [19]
Nolte

[11] 3,718,048
[45] Feb. 27, 1973

[54] RELIEF VALVES FOR DIFFERENTIAL PRESSURE FLOW METERS

[75] Inventor: Claude B. Nolte, Villanova, Pa.

[73] Assignee: Kingmann-White, Inc., Placentia, Calif.

[22] Filed: June 7, 1971

[21] Appl. No.: 150,639

[52] U.S. Cl. .................................. 73/407 R, 73/410
[51] Int. Cl. .......................................... G01l 13/02
[58] Field of Search .... 73/407 R, 410, 392, 393, 395, 73/205 R

[56] References Cited

UNITED STATES PATENTS

| | | | |
|---|---|---|---|
| 3,332,287 | 7/1967 | Amen | 73/407 R |
| 3,437,964 | 4/1969 | Tausch | 73/407 R |

*Primary Examiner*—Donald O. Woodiel
*Attorney*—John W. Logan, Jr.

[57] ABSTRACT

A differential pressure flow meter is provided with a relief valve for preventing inaccuracies from being induced in the readout of the meter by pressure reversals in the pipe. The flow meter has a bellows partitioning the meter casing into high and low pressure chambers at opposite sides of the bellows. In one embodiment, a flow passage in the casing extends between the high and low pressure chambers and a ball valve element is mounted in the flow passage with a portion of its surface confronting the low pressure chamber and biased against a shoulder by a spring. The ball is disengaged from its seat when the pressure in the low pressure chamber exceeds the pressure in the high pressure chamber to permit rapid equalization of pressure in the two chambers. In another embodiment, a disc-like valve element is mounted on the bellows for displacement with the bellows. The valve element is biased against a shoulder surrounding a passage in the bellows and is opened when a pressure reversal causes the bellows to contract toward the high pressure chamber. A stem on the valve element is adapted to engage an actuator in the high pressure chamber to open the valve and equalize the pressure in the two chambers.

10 Claims, 3 Drawing Figures 3,718,048

INVENTOR:
CLAUDE B. NOLTE
BY Howson & Howson
ATTYS.

RELIEF VALVES FOR DIFFERENTIAL PRESSURE FLOW METERS

The present invention relates to new an useful improvements in differential pressure type flow meters for measuring and recording flow through a conduit and particularly to the provision of means in such flow meters for preventing inaccuracies in the zero flow reading of such flow meters due to sudden pressure changes or a reversal in the direction of flow of the flow stream being measured.

In the normal course of gas flow measurement, conditions arise which can cause the appearance of a reversal of gas flow as far as the interpretation of the orifice meter is concerned. This can occur, for example, if gas flowing in a long pipeline is suddenly caused to stop. This could occur if a compressor were shut down or if a valve, somewhere in the pipeline, were to be closed. The inertia of the gas traveling in one direction will make the gas "pile up" upstream at the obstruction. In the course of equalization, actual reversal of flow can occur, or a shockwave can pass down the pipeline and through the orifice creating the impression of a reversal of flow.

For whatever the cause, the differential pressure sensing device will register, for a short time, a reversal of differential pressure.

Some bellows type flow recorders, including the type described in U.S. Pat. No. 3,422,680, issued to Claude B. Nolte on Jan. 21, 1969, will tend to show a slight difference of zero on the chart, if the recording device has been subjected to a reversal of differential pressure compared to the location of zero that would be indicated if the differential pressure had been reduced from above zero. In part, this tendency results from the behavior of a spring element when it is moved through its null position. The spring element can be the range spring which establishes the differential pressure required to take the instrument from zero to full scale. Additionally, it may also apply to the flexible metallic bellows itself. In either case, the spring element tends to be bistable with respect to an absolute zero.

The behavior is not unlike the characteristics, also seen in spring devices, sometimes known as "mechanical hysteresis". In other words, the spring element will take up a slightly different position depending upon whether it has been subjected to an increasing load up to some value or has been subjected to a higher and decreasing load coming back to the same value. The degree of difference is influenced by the amount of deflection beyond the reference point to which the device is subjected on the decreasing mode.

Regardless of the nature and cause of the phenomenon, this latter trait offers a way to minimize if not wholly eliminate, the very undesirable factor of zero instability. If the amount of motion of the pen, and hence of the measuring element, below zero is kept to a very low value, the zero shift is eliminated.

Mechanical stops to limit the travel of the bellows will not accomplish what is required. Actually, the limitation of the reverse differential pressure across the bellows structure is the best method of reducing zero shifts. In this invention, the limitation or avoidance of reverse differential pressure being applied across the bellows is accomplished by valve means which may be opened mechanically or by a very slight buildup of reverse differential pressure. Once the valve opens, the level of differential pressure is held to a minimum value.

With the foregoing in mind a primary object of the present invention is to provide an improved differential pressure flow meter capable of accurately indicating zero flow after sudden pressure changes or reversal in the direction of flow of the flow stream being measured.

As another object, the present invention provides a novel relief valve structure for use in conjunction with pressure responsive means in a differential pressure flow meter to prevent excessive displacement of the pressure responsive means in response to sudden changes in the flow stream.

More specifically, in a differential pressure type flow meter having a casing and movable bellows means partitioning the casing into high and low pressure chambers, there is provided a flow passage connecting the chambers and relief valve means in the passage to equalize the pressure in the chambers when there is a reversal of pressure therein. In one embodiment, the connecting flow passage contains a spring biased ball valve element which normally seats against a shoulder and which is exposed to the low pressure chamber. Upon the occurrence in the low pressure chamber of a pressure greater than in the high pressure chamber, the ball unseats and the pressure in both chambers is equalized preventing excessive displacement of the bellows. In another embodiment, the connecting flow passage is provided in the bellows and a disc-shaped valve element is mounted in the low pressure chamber and on the bellows for displacement therewith. A compression spring biases the valve element closed, and a stem on the valve element extends through the passage into the high pressure chamber. Upon the occurrence of a pressure change as noted above, the bellows contracts toward the high pressure chamber and the stem engages an adjustable actuator to open the valve against its spring bias for equalizing the pressure in the chambers.

These an other objects, features, and advantages of the present invention should become apparent from the following description when taken in conjunction with the accompanying drawings in which.

Figure 1:
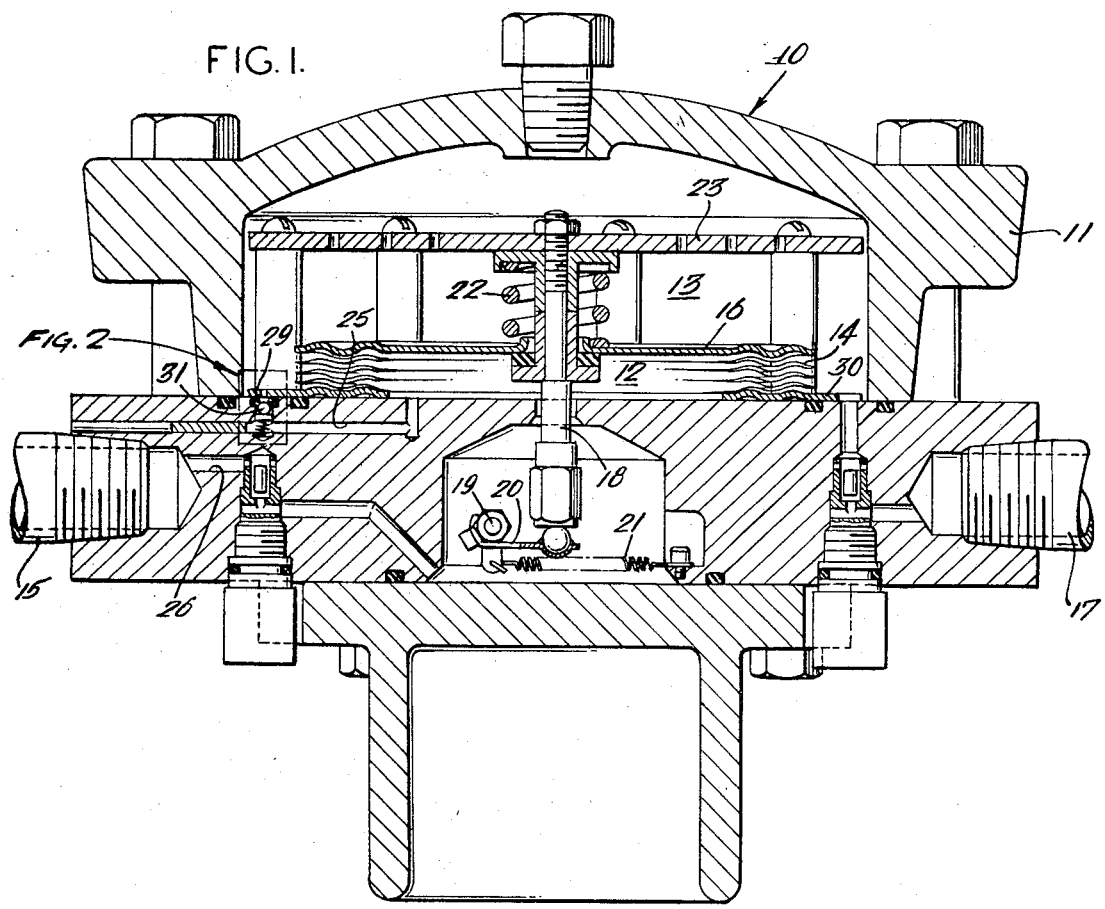
FIG. 1 is a sectional view of a differential pressure flow meter embodying the relief valve structure of the present invention.

Referring now to the drawing, there is illustrated in FIG. 1 a differential pressure flow meter embodying the present invention. As illustrated therein, the flow meter 10 has a casing 11 which is divided into a high pressure chamber 12 and a low pressure chamber 13 by movable partitioning means, in the present instance a bellows 14. The high pressure chamber 12 is located inside the bellows 14 and is in fluid communication with the upstream side of a conventional orifice plate through a passageway 15. The low pressure chamber 13 surrounds the periphery and face plate 16 of the bellows 14 and is in fluid communication with the downstream side of the orifice plate through a passageway 17. As more fully described in the aforementioned patent, variations in the pressure differential in the pressure chambers 12 and 13 caused by changes in flow rate through an orifice plate, cause the bellows plate 16, and hence a rod 18 connected centrally thereto, to move vertically. The movement of the rod 18 is transmitted to a chart pen in suitable recording instrumentation through a shaft 19 on which is mounted an arm 20. The arm 20 is biased by means of an extension spring 21 into engagement with the bottom end of the rod 18, and the bellows 14 is biased by means of spring elements 22 and 23.

As described thus far, the flow meter is conventional, and pressure reversals as referred to above tend to cause the bellows 14 to contract and hence to displace the arm 20 and shaft 19. Hysteresis in the bellows-connected spring element 23 tends to prevent the chart pen from returning to its original or "zero" position immediately after a pressure reversal. Heretofore, means has not been available to obviate the effect of such pressure reversals.

In accordance with the present inventions, means are provided to limit the effect of a reversal of pressure in the flow meter. This is accomplished by limiting the reverse differential pressure across the pressure responsive means such as the bellows to reduce to a negligible amount the shift in zero position of the indicator. The limitation of reverse differential pressure is accomplished by the use of valve means which may be opened mechanically or by a slight buildup of reverse differential pressure.

Figure 2:
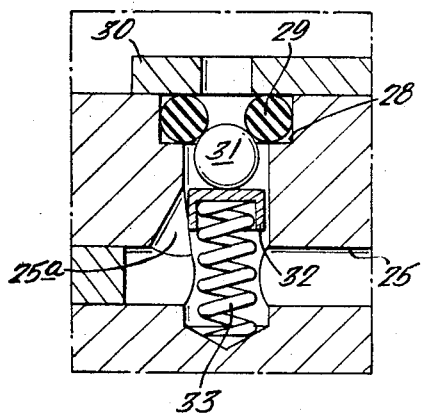
FIG. 2 is an enlarged sectional view of the relief valve enclosed by the broken lines in FIG. 1.

With reference to FIGS. 1 and 2 of the drawings, valve 24 is provided in the casing 11 to equalize the pressure in the pressure chambers upon the occurrence of a pressure reversal. A passage 25 connects the high pressure chamber 12 with the low pressure chamber 13 and the valve 24 is positioned in the passage 25. The passage 25 opens upwardly at its inner end into the high pressure chamber 12 inside the bellows and opens upwardly at its outer end into the low pressure chamber 13 adjacent the periphery of the bellows 14. As may be seen in FIG. 2, the outer end of the passage 25 is recessed at 28 to receive an O-ring 29 which is retained by a plate 30 and which provides shoulder means for engaging a ball valve element 31. The ball valve element 31 is carried by an inverted cup 32 mounted on the upper end of a compression spring 33, with a portion of the ball surface confronting the low pressure chamber 13. In addition, it is to be noted that the cup 32 and spring 33 are mounted in a lateral enlargement 25 a of the passage 25, the enlargement permitting fluid pressure to be communicated between the chambers upon downward displacement of the ball valve element 31.

In normal usage, pressure on the upstream side of the orifice plate is communicated to the high pressure chamber 12 through the passageway 15, and pressure on the downstream side of the orifice plate is communicated to the low pressure chamber 13 through the passageway 17. Changes in the differential pressure between the two pressure chambers cause the bellows to expand or contract, with the chart pen moving in response to angular displacement of the shaft 19. Upon an increase in the pressure in the low pressure chamber 13 above the pressure in the high pressure chamber 12, the ball valve element 31 unseats from the O-ring 29 and is displaced downwardly in the passage 25. As a result, the chambers are in fluid communication with one another, and the pressures therein are equalized. After the pressures in the chambers have been equalized, the spring 33 returns the ball 31 to its normal position in engagement with the O-ring 29, thereby permitting the meter to operate in the usual manner.

Figure 3:
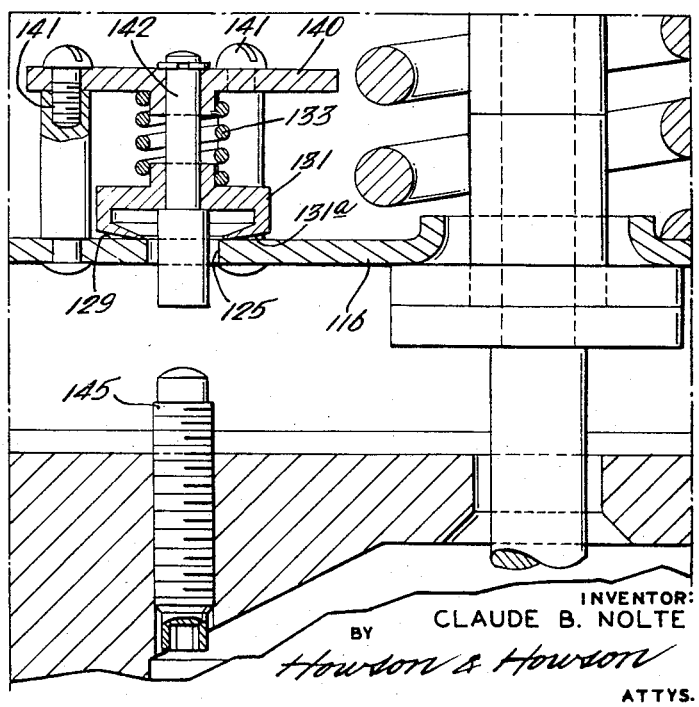
FIG. 3 is an enlarged fragmentary sectional view of a differential pressure flow meter having a modified relief valve embodying the present invention.

In another embodiment of the present invention, a passage 125 (FIG. 3) is provided in a bellows plate 116 of a bellows type differential pressure flow meter. An annular surface 129 surrounds the upper end of the passage 125 and is engaged by a disc-like valve element 131 having an inturned peripheral flange 131a blocking fluid communication through the passage 125. Means is provided to mount the valve element 131 for displacement into and out of engagement with the shoulder 129. In the present instance, the valve mounting means includes a plate 140 spaced vertically from the bellows plate 116 and mounted thereto by a series of threaded fasteners 141, 141. The plate 140 has a central through bore slidably receiving a stem 142 to which the valve element 131 is secured. The valve element 131 is biased into its normally-closed position by means of a compression spring 133 engaging between the bearing plate 140 and the top side of the valve element 131.

In order to unseat the valve element 131 from the shoulder 129 on the top side of the bellows plate 116, the valve stem 142 depends into the high pressure chamber 113 through the passage 125. A valve actuator, in the present instance a stop 145, is disposed coaxially of the stem 142 and is spaced a predetermined distance from the lower terminus thereof. The stop 145 is externally threaded and engages in an internally threaded bore in a wall of the casing to permit it to be adjusted with respect to the stem 142 upon rotation by means of a suitable tool engaged in internal wrench flats in the lower end thereof.

In operation, a pressure reversal as described heretofore causes the bellows plate 116 to move downwardly, carrying with it the valve element 131 and its stem 142. Upon a predetermined amount of downward movement, the bottom end of the stem 142 contacts the top end of the actuator stop 145 and causes the valve element 131 to move upwardly against the bias of the spring 133 and disengage the shoulder 129. The pressure chambers are thus in fluid communication with one another, and the pressures therein are equalized. After the pressures have equalized, the spring 133 urges the valve element 131 against its shoulder 129, and the flow meter functions again in the conventional manner.

In view of the foregoing, it should be apparent that there has now been provided an improved differential pressure flow meter which is capable of accurately measuring fluid flow rates irrespective of changes in flow conditions.

While preferred embodiments of the present invention have been described in detail, various modifications, alterations or changes may be made without departing from the spirit and scope of the present invention as defined in the appended claims.

I claim:

1. In a differential pressure responsive apparatus including a casing and means partitioning said casing into first and second pressure chambers, said first pressure chamber being a normally high pressure chamber and said second pressure chamber being a normally low pressure chamber, said partitioning means including a movable member separating the two chambers with the movable member being in a zero position when the pressure in said first chamber equals the pressure in said second chamber, and said member movable in one direction above said zero position upon an increase in pressure in said first chamber above the pressure in the second chamber and movable in the opposite direction below a zero position upon an increase in pressure in said second chamber above the pressure in said first chamber, the improvement comprising: means providing a fluid flow passage between said first and said second chambers, valve means positioned within said passage, said valve means including a valve element which is normally urged to a closed position when the pressure in said first chamber is equal to or greater than the pressure in said second chamber, said valve element adapted to be moved to an open position permitting fluid communication between said chambers when the pressure in said second chamber becomes greater than the pressure in said first chamber to prevent movement of said movable member in said opposite direction below said zero position by permitting substantial equalization of the pressure in said first and second chamber, and means interconnected with said movable member to provide an indication of the position of said movable member.

2. Apparatus according to claim 1 wherein said valve means includes means providing a shoulder between said pressure chambers in said passage means, a valve element mounted for displacement into and out of engagement with said shoulder means to block and afford fluid communication between said chambers, and means biasing said valve element into engagement with said shoulder means.

3. Apparatus according to claim 2 wherein said valve element has a surface confronting said second pressure chamber and said valve element is disengaged from its associated shoulder means upon the application of greater pressure on said valve surface in said second pressure chamber than in said first pressure chamber.

4. Apparatus according to claim 3 wherein said partitioning means includes a bellows with said first pressure chamber being inside the bellows and said second pressure chamber surrounding the periphery and one face of said bellows, and said passage means extending in said casing from the inside of said bellows and to its periphery.

5. Apparatus according to claim 4 wherein said passage means includes an enlargement extending away from said shoulder means, said biasing means includes a compression spring mounted in said enlargement, and said valve element including an inverted cup mounted on one end of said spring, a ball carried on said cup, and an O-ring mounted to said shoulder and engageable by said ball.

6. Apparatus according to claim 2 wherein said shoulder means is carried by said partitioning means for displacement therewith in response to changes in said pressure differential and said valve element is mounted in said second pressure chamber, and including actuator means cooperable with said valve element to disengage said element from said shoulder upon displacement of said partitioning means a predetermined distance toward said first pressure chamber in response to a predetermined change in pressure differential between said pressure chambers.

7. Apparatus according to claim 6 wherein said valve element mounting means includes a stem carried by said valve element, a bearing plate spaced form said partitioning means and slidably mounting said stem, and post means mounting said bearing plate to said partitioning means.

8. Apparatus according to claim 7 wherein said valve element has a peripheral flange with a tapered portion turned inwardly toward said stem and engageable against said shoulder and said biasing means includes a spring mounted between said bearing plate and said valve element to urge said flange against said shoulder.

9. Apparatus according to claim 7 wherein said actuator means includes a stop disposed coaxially with said valve stem and normally spaced from the terminus of said stem and means mounting said stop in said casing for adjustment axially of said stem to vary the amount of displacement of the partitioning means required to disengage the valve element from the shoulder.

10. Apparatus according to claim 9 wherein said stop mounting means includes an internally threaded bore in said casing and external threads on said stop threadedly engaging said bore threads, and means for rotating said stop whereby the spacing between the stop and the valve stem may be adjusted upon rotation of the stop.

* * * * *